(12) United States Patent
Delling et al.

(10) Patent No.: US 9,085,253 B2
(45) Date of Patent: Jul. 21, 2015

(54) HEADREST FOR VECHICLE SEATS

(75) Inventors: Gerhard Delling, Schmidgaden (DE);
Christian Poehlmann, Amberg (DE)

(73) Assignee: GRAMMER AG, Amberg (DE)

( * ) Notice: Subject to any disclaimer, the term of this patent is extended or adjusted under 35 U.S.C. 154(b) by 261 days.

(21) Appl. No.: 13/229,794

(22) Filed: Sep. 12, 2011

(65) Prior Publication Data

US 2013/0002000 A1    Jan. 3, 2013

(30) Foreign Application Priority Data

Sep. 10, 2010 (DE) .......................... 10 2010 044 932

(51) Int. Cl.
*A47C 7/36* (2006.01)
*B60N 2/48* (2006.01)

(52) U.S. Cl.
CPC .................................... *B60N 2/4864* (2013.01)

(58) Field of Classification Search
USPC ............ 297/216.12, 400, 406, 408, 391, 409, 297/404
See application file for complete search history.

(56) References Cited

U.S. PATENT DOCUMENTS

| 4,796,953 | A  | * | 1/1989 | Pereira | 297/400 |
| 6,983,995 | B1 | * | 1/2006 | Veine et al. | 297/391 |
| 8,182,042 | B2 | * | 5/2012 | Reel et al. | 297/391 |
| 2005/0077762 | A1 | * | 4/2005 | Kraemer et al. | 297/216.12 |
| 2009/0058162 | A1 | * | 3/2009 | Boes et al. | 297/406 |
| 2009/0146479 | A1 | * | 6/2009 | Boes et al. | 297/391 |
| 2010/0026061 | A1 | * | 2/2010 | McFalls et al. | 297/216.12 |
| 2010/0127541 | A1 | * | 5/2010 | Kotz | 297/216.12 |
| 2010/0283306 | A1 | * | 11/2010 | Boes et al. | 297/408 |
| 2011/0109144 | A1 | * | 5/2011 | Eckstein et al. | 297/409 |

FOREIGN PATENT DOCUMENTS

DE        20112312 U1    1/2002
DE     102006016270 A   10/2007

* cited by examiner

*Primary Examiner* — Rodney B White
*Assistant Examiner* — Alexander Harrison
(74) *Attorney, Agent, or Firm* — Andrew Wilford

(57) ABSTRACT

A headrest for use on a motor-vehicle seat back has a base that is secured to the seat back, a head part, and respective base and head guides supporting the head part on the base for displacement in a direction between a rear rest position and a front extended position. A slide is provided between the base and the head part and is movable relative to both the head part and the base on shifting of the head part between the positions. A gear assembly engages both the head part and the base.

6 Claims, 11 Drawing Sheets

HEADREST FOR VECHICLE SEATS

FIELD OF THE INVENTION

The present invention relates to a headrest. More particularly this invention concerns a headrest for a motor vehicle.

BACKGROUND OF THE INVENTION

A standard motor-vehicle headrest has a movable head-contact part that is adjustable relative to a fixed base in order to be able to move a front surface of the movable part into the required position with respect to the head of an occupant in the automobile seat.

A headrest in which a part can be moved relative to a base body between a back and a front position is described in DE 10 2006 016 270. An intermediate sleeve of the headrest has an external thread engaging with a thread of the movable part. The intermediate sleeve also has an internal thread engaging the thread of a base body. A spring element urges the movable part into the front position. Shifting of the movable part is effected by rotation of the intermediate sleeve.

A headrest in which the movable part is carried by interacting teeth of a base and of the movable part and of a toothed shaft is disclosed in US 2010/0127541.

Particularly in the case of so-called L-shaped headrests, which are formed in such a way that they can be placed on the seat back of the automobile seat and then project only slightly over the top of the seat back, there is little room available for mounting and guiding the movable part.

OBJECTS OF THE INVENTION

It is therefore an object of the present invention to provide an improved motor-vehicle headrest.

Another object is the provision of such an improved motor-vehicle headrest that overcomes the above-given disadvantages, in particular whose operating mechanism takes up little space but is rugged and reliable.

SUMMARY OF THE INVENTION

A headrest for use on a motor-vehicle seat back has according to the invention a base that is secured to the seat back, a head part, and respective base and head guides supporting the head part on the base for displacement in a direction between a rear rest position and a front extended position. A slide is provided between the base and the head part and is movable relative to both the head part and the base on shifting of the head part between the positions. A gear assembly engages both the head part and the base.

In other words, the headrest has a base which is fixed to the seat back of an automobile seat. The base can be retained on the seat back in a height-adjustable manner, for example by at least one support rod. A movable part can be moved along a movement path relative to the base between a rest position and an extended position. In the extended position, the movable part is moved closer toward the head of an occupant of the seat relative to the rest position.

The movable part is mounted on the base by a mounting device. The guide and mount comprises a first guide associated with the base and second guide associated with the movable part as well as a telescopic device or slide. The slide can be moved relative to the base and relative to the movable part. The slide comprises at least one telescopic element which engages with first guide of the base and with the second guide of the movable part and projects partially out of the guide of the base in the extended position. The telescopic element can be slid longitudinally, for example parallel to the movement path of the movable part. The position of at least one telescopic element of the slide is controlled by the gear assembly.

Within the meaning of the invention, the guide and mount includes means for mounting and for guiding the movable part, for example along the movement path and in a predetermined direction.

Within the meaning of the invention, telescopic means that the first guide, the second guide and the slide can be moved between a nested and an extended position. In the extended position, there is a slight overlap relative to the nested position between the slide and the first guide and between the slide and the second guide. The first guide, the second guide and the at least one telescopic element are coaxial, for example when moving along their movement path.

The headrest comprises the gear assembly that controls the telescopic element or slide. The telescopic element is controlled, for example, depending on the position of the movable part. A position of the telescopic element, for example, is associated with each position of the movable part.

The headrest with the characteristics according to the invention requires little installation space and yet guarantees a functionally reliable guiding of the movable part.

According to a first embodiment, the gear assembly comprises the first guide and the second guide as well as the toothed elements associated with and interacting with the slide. The toothed elements can be racks that extend over a substantial part of the width of the headrest. According to an alternative embodiment, toothed elements, for example, can be formed at least in two different side regions of the base, the movable part and the telescopic element of the headrest. At least two movable toothed elements are, for example, movably connected in such a way that the side regions always execute the same movement. This guarantees precise guiding. Jamming of the movable part and the slide can also be avoided.

A further embodiment is characterized in that the gear assembly comprises racks formed on the base and on the movable part and at least one gear associated with the slide. The gear engages with the racks of the base and of the movable part. The gear is fixed to but rotatable on the telescopic element, for example. The base and the movable part each have at least two racks, for example, that are on opposite sides of the headrest. Longitudinal center axes of the racks, for example, extend parallel to the movement path of the movable part. The telescopic unit comprises, for example, at least two gears on in different sides of the headrest. The gears are movably connected, for example. The gears can be fixed on a common shaft, for example. The shaft is journaled on the telescopic element, for example. Each gear interacts, for example, with a respective rack of the base and with a respective rack of the movable part.

Another embodiment of the invention is characterized in that the base and the movable part as well as possibly the slide comprise drawer-like interacting mounting structures. For example, at least one mounting structure of the movable part and at least one mounting structure of the telescopic element can be nested in a drawer-like manner with a mounting structure of the base in the rest position. The mounting structure of the movable part and the telescopic element can, for example, be moved to an extended position which corresponds to the extended position of the movable part, wherein the mounting structures of the movable part, the telescopic element and the base overlap one another to a lesser extent, that is the overlap of two interacting mounting structures is in each case less than in the nested position.

Another embodiment is characterized in that guide surfaces of at least one mounting structure are designed approximately in a C-shape. The C-shaped mounting structure has at least two mounting and guide surfaces arranged at an angle, in particular at right angles, to each other. For example, the mounting structure comprises three surfaces which, for example, are designed as sliding and guide surfaces, wherein two opposing surfaces are in each case arranged at right angles, for example, to a third surface. In this way, force can be transmitted in several directions. The first guide, the second guide and the slide can, for example, comprise at least two C-shaped mounting structures in each case. The two mounting structures can, for example, be designed mirror-imaged in both side regions of the headrest. In this way, for example, the degrees of freedom of the movable part and of the telescopic element can be restricted so that only a movement along the movement path between the rest position and the extended position is possible.

According to a further embodiment of the invention, a one-way catch that can be locked or released is provided. In the locking position, the one-way catch prevents movement of the movable part in at least one direction. The one-way catch is designed as a latch, for example. The one-way catch comprises at least one row of teeth for example, formed on the base, and at least one locking element mounted on the movable part and movable between a locking position and a release position. In the locking position, movement of the movable part is not possible in at least one direction. For example, movement of the movable part is not possible in the locked position. According to an alternative embodiment, movement is possible in one direction, for example toward the extended position. In the release position, movement of the movable part is possible toward the extended position and toward the rest position. In the locking position, the one-way catch is loaded in a reset position, for example, and in the release position is adjustable by an actuating device. The actuating device comprises an actuating element, for example, on the base or the movable part.

BRIEF DESCRIPTION OF THE DRAWING

The above and other objects, features, and advantages will become more readily apparent from the following description, reference being made to the accompanying drawing in which.

DETAILED DESCRIPTION

Figure 1:
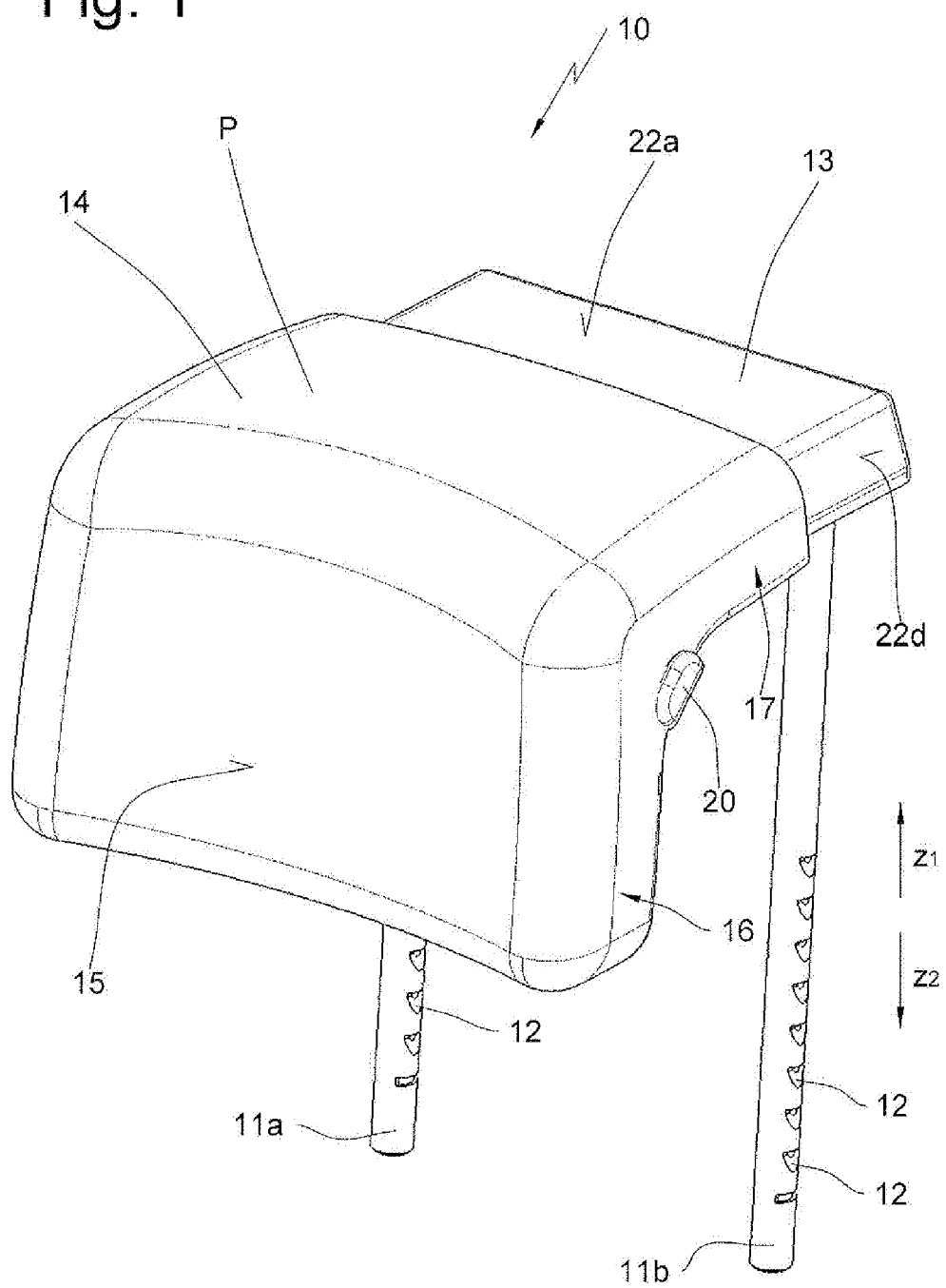
FIG. 1 is a perspective view of a headrest according to the invention.
Figure 10:
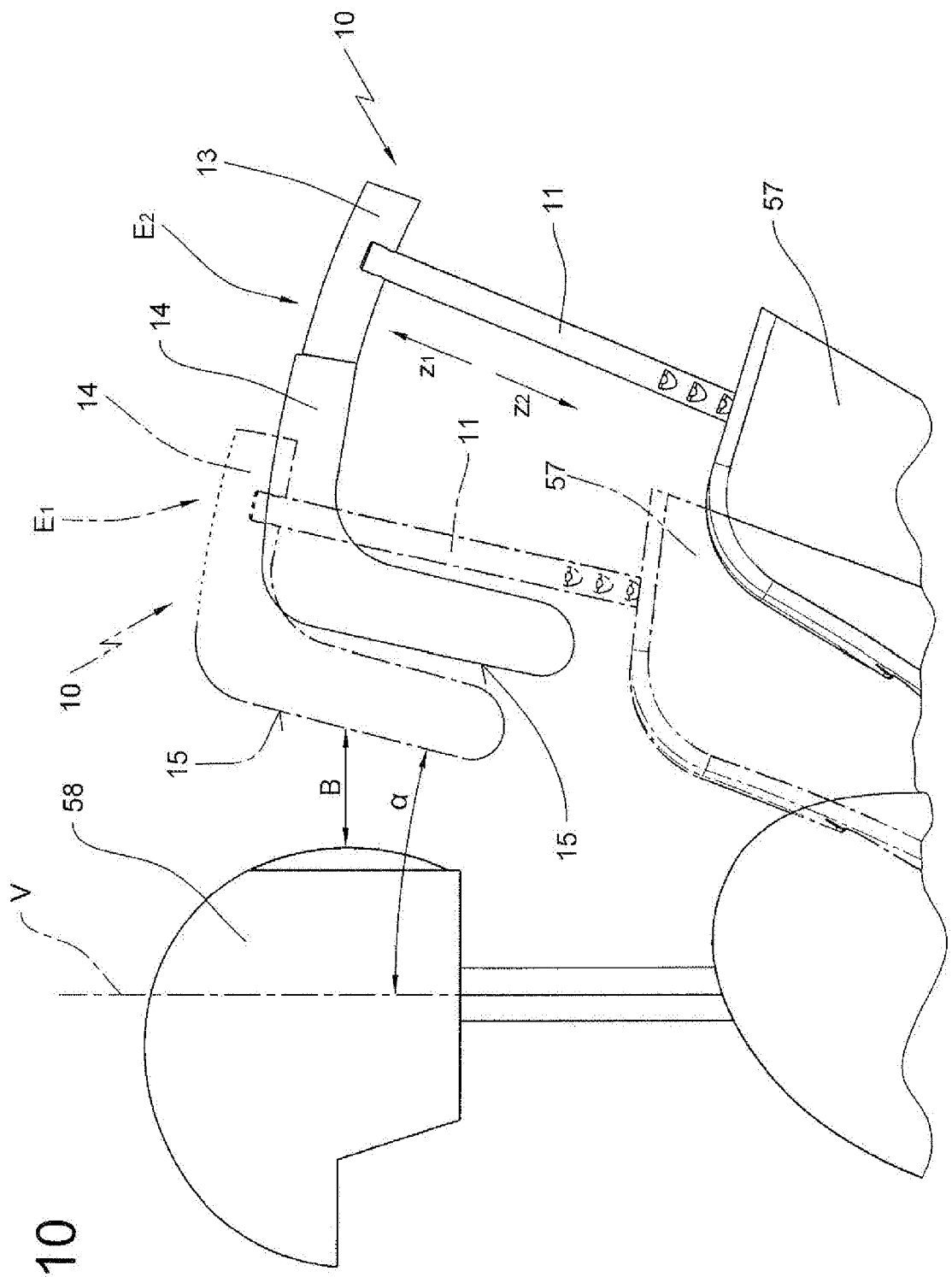
FIG. 10 is a schematic side view of the headrest and a back of an automobile seat in several different positions.

As seen in FIG. 1, a headrest 10 has support rods 11a and 11b that are vertically adjustable in the back of a vehicle seat such as shown at 57 in FIG. 10. The headrest 10 can be set at any of a plurality of vertically offset positions by means of rods and adjusted in vertical directions z1 and z2 with the assistance of vertically spaced notches 12 in the rods 11a and 11b. The headrest 10 has a fixed base 13 and a movable head-contact part 14. The movable part 14 is provided with upholstery P and forms a generally vertical front head-contact surface 15. The upper ends of the support rods 11a and 11b are fixed in downwardly open sockets 26a and 26b (FIG. 5) of the base 13.

Figure 2:
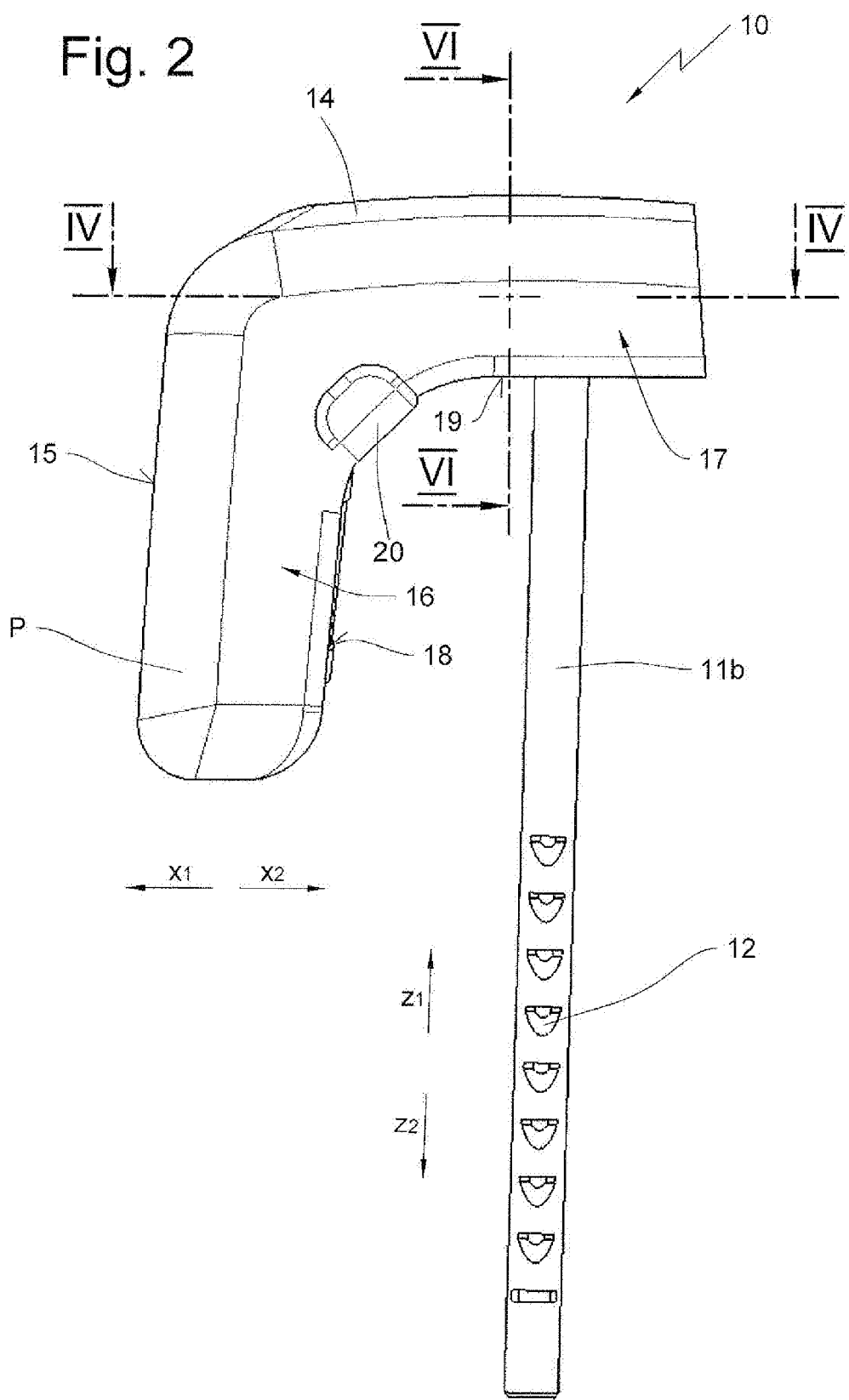
FIG. 2 is a side view of the headrest in the starting position.

FIG. 2 shows that the movable part 14 is of inverted L-shape with a horizontally forwardly projecting upper leg 16 and a downwardly projecting back leg 17. A back face 18 of the leg 16 can therefore engage against a front face of the unillustrated seat back and a lower face 19 of the leg 17 can engage against an upper face of the seat back that is not shown in FIG. 2. The headrest 10 then only extends above the seat back slightly so that the view of the driver to the rear is only impaired to a small extent by the headrest 10.

Figure 3:
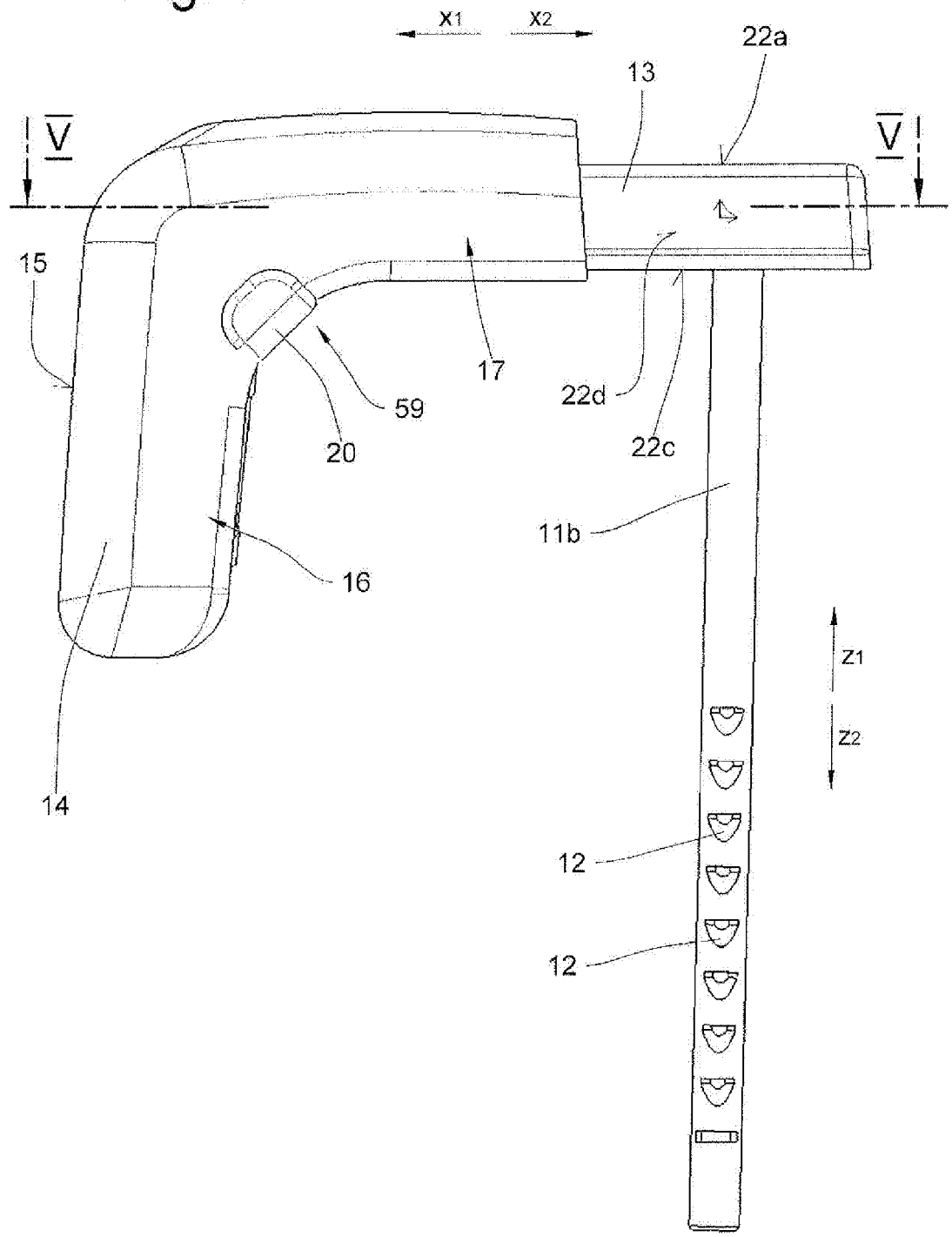
FIG. 3 is a side view of the headrest in the extended position.
Figure 6:
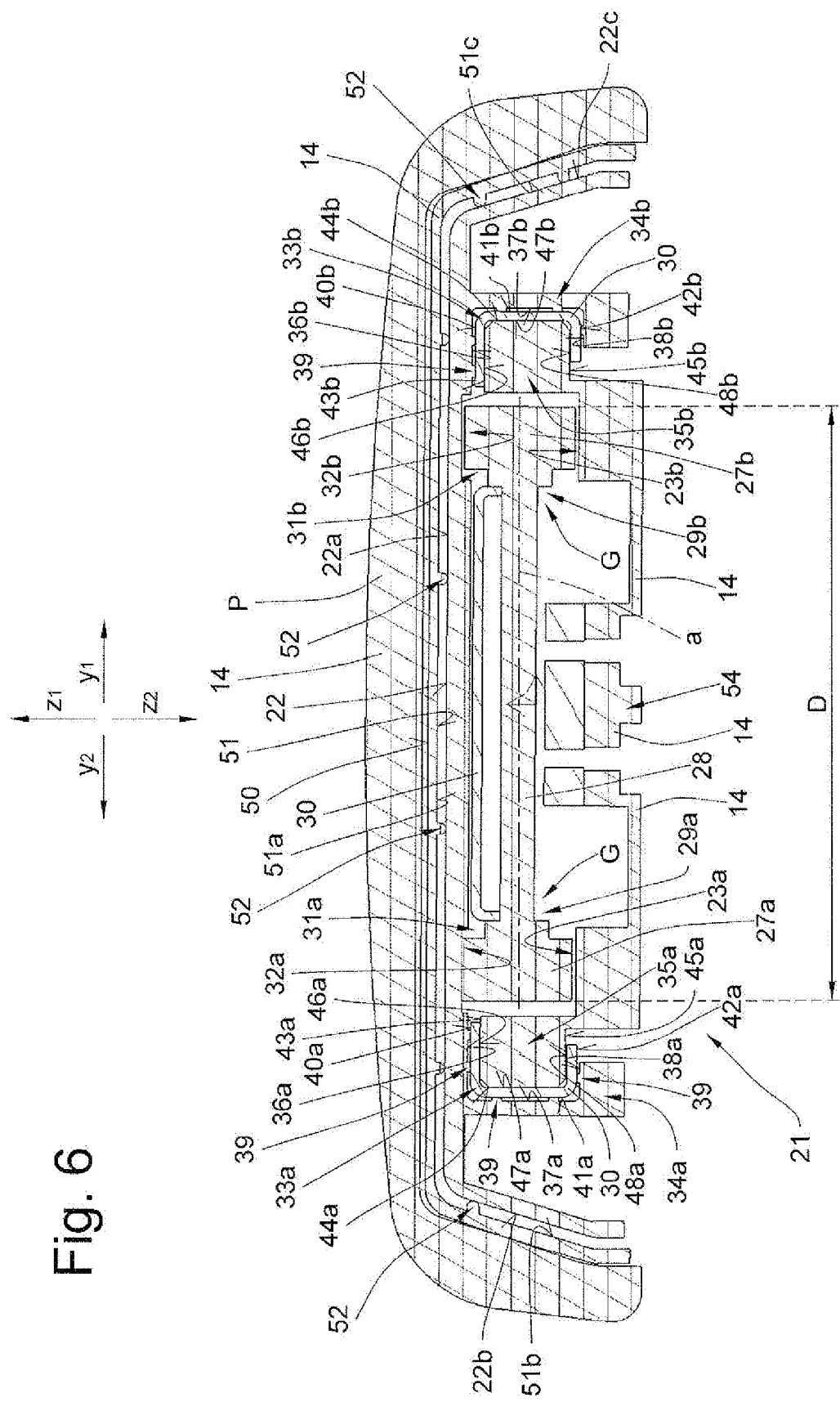
FIG. 6 is a section taken along line VI-VI of FIG. 2.

The movable part 14 is shown in FIG. 2 in a retracted or rest position from which it can be moved into a forwardly extended position shown in FIG. 3 by exerting a force on the movable part 14 in a horizontal forward direction x1 that is sufficient to overcome the holding force of a one-way catch 59 designed as a one-way catch. Movement of the movable part 14 in a rearward horizontal direction x2 into the rest position is normally prevented by the latch 59 and is only possible when a button 20 is pressed. The movable part 14 is mounted on the base 13 by a mount 21 (FIG. 6). The base 13 is of rectangular section and forms four sliding surfaces 22a-d, of which only surfaces 22a, 22c, and 22d are visible in the drawing.

Figure 5:
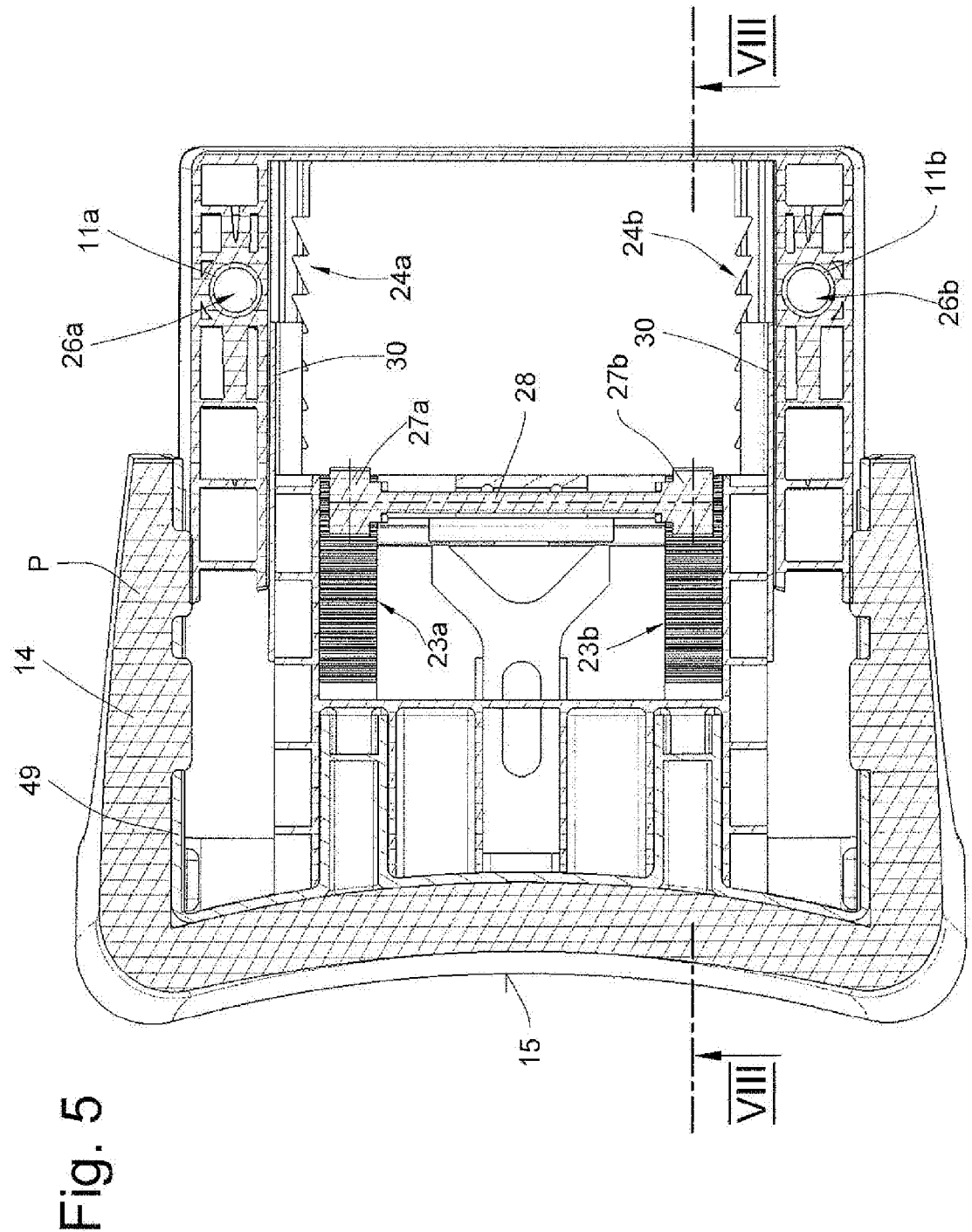
Figure 9:
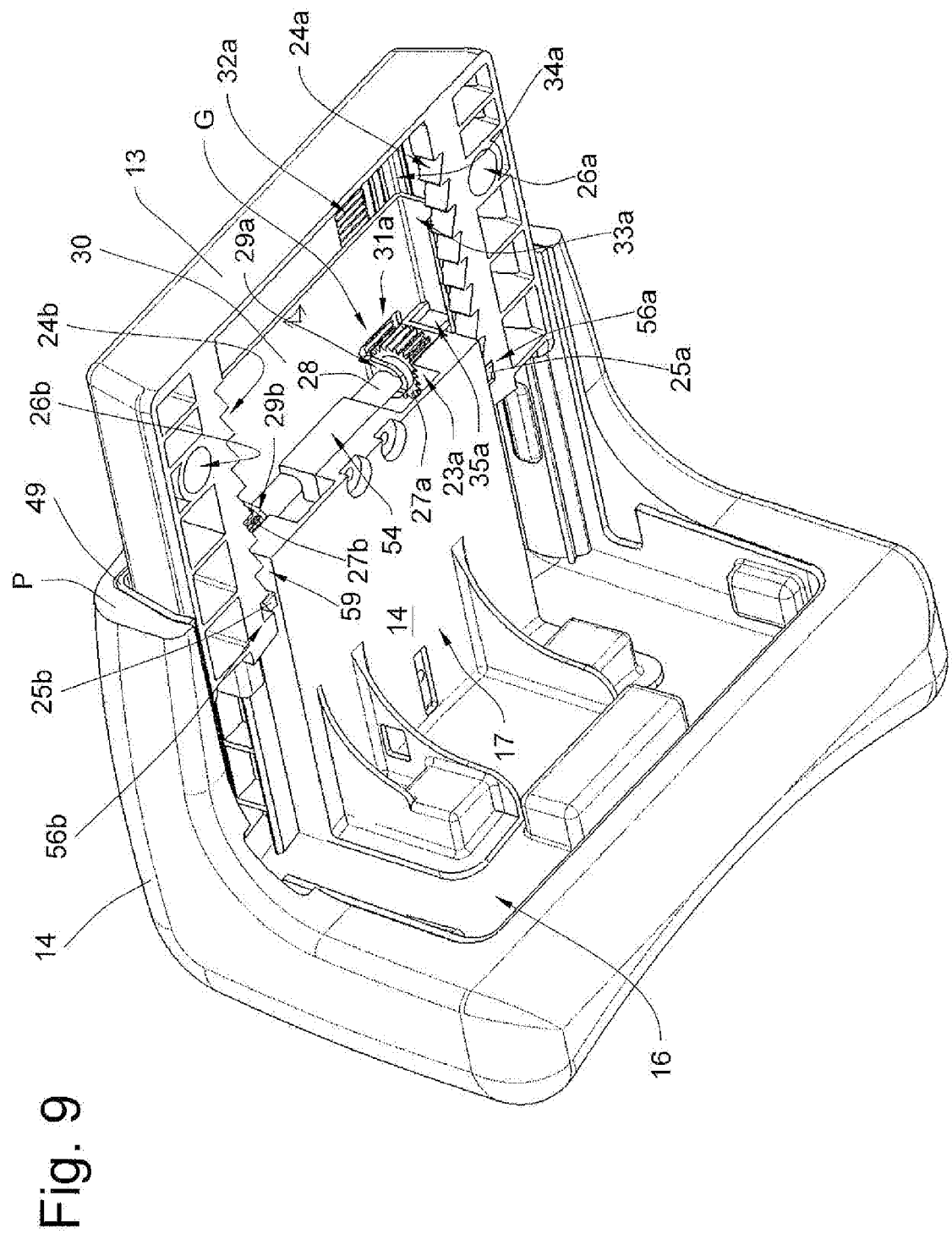
FIG. 9 is a partly sectional bottom view of the headrest.

As can be seen in FIGS. 5 and 9, horizontally confronting rows 24a and 24b of ratchet teeth are formed on the base 13. The row 24a coacts with a locking element 25a and the row 24b with a locking element 25b of the movable part 14. The rows 24a and 24b of sawteeth along with the locking elements 25a and 25b form the one-way latch 59.

Figure 4:
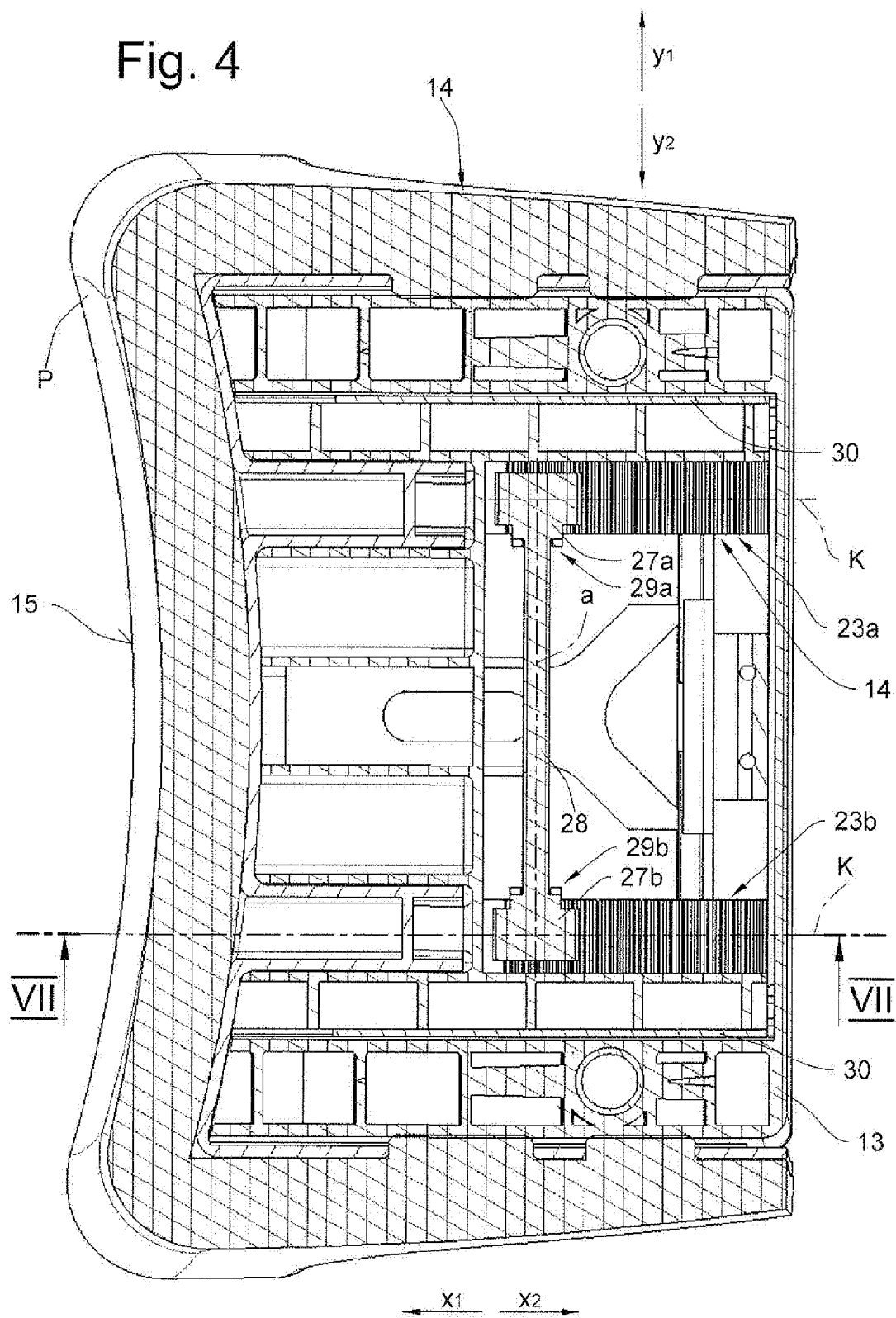
FIGS. 4 and 5 are sections taken along respective line IV-IV and V-V of FIGS. 2 and 3.

FIG. 4 shows that parallel lower racks 23a and 23b are formed on the movable part 14 with upwardly directed teeth. Longitudinal center axes k of the lower racks 23a and 23b are parallel to the horizontal front-to-back x-axis of directions x1 and x2. The lower racks 23a and 23b are straight and their teeth are parallel to the horizontal and transverse y-axis of the directions y1 and y2. The flanks of the teeth of the lower racks 23a and 23b can withstand forces in the directions x1 and x2. Gears 27a and 22b mesh with the lower racks 23a and 23b and are securely fixed to a common shaft 28 so the shaft 28 and the gears 27a and 27b rotate jointly about an axis of rotation a. The shaft 28 is mounted in bearings 29a and 29b of a slide 30.

According to FIG. 6, the gears 27a and 27b extend upward through respective apertures 31a and 31b in the slide 30 and engage respective upper racks 32a and 32b formed on the base 13. The upper racks 32a and 32b are substantially identical to the racks 23a and 23b, but have downwardly directed teeth.

The slide 30 is of bent sheet metal and has two U-section edge regions 33a and 33b that can move front-to-back, that is in directions x1 and x2, in U-section guides 34a and 34b of the base 13 while engaging around guide edges 35a and 35b of the movable part 14.

The gears 27a and 27b rotationally coupled by the shaft 28 and mounted on the slide 30 engage with the respective upper racks 32a and 32b of the base 13 and with the respective lower racks 23a and 23b of the movable part 14, thus forming a gear assembly G. The gears 27a and 27b are separated from each other in the directions y1 and y2 by a large spacing D so that they prevent the base 13, the movable part 14 or the slide 13 from canting relative to one another about the vertical z-axis of directions z1 and z2. It is therefore impossible for the movable part 14 or the slide 30 to jam, as its sides always move synchronously. The slide 30 is moved by the gear assembly G, depending on the adjustment position of the movable part 14, into a defined position in which the movable part 14 is secured by the one-way catch 59.

The guides 34a and 34b of the base 13 have respective planar guide faces 36a, 37a, 38a and 36b, 37b, 38b that are all provided with guide ribs 39 which project perpendicularly from the respective planes and that extend in the horizontal directions x1 and x2. The guide ribs 39 of the faces 36a, 37s, 38a and 36b, 37b, and 38b form sliding surfaces for outer faces 40a, 41a, 42a and 40b, 41b, and 42b of the respective edge regions 33a and 33b of the slide 30. The guides 34a and 34b are of a square C-shape with a substantially right angle between the faces 36a, 36b and 37a, 37b and between the faces 37a, 37b and 38a, 38b. A similar substantially right angle is likewise formed between the sliding surfaces 40a, 40b and 41a, 41b and the sliding surfaces 41a, 41b and 42a, 42b.

The guide edge 35a is provided with outer surfaces 43a, 44a and 45a, wherein in each case the outer surfaces 43a and 44a and the outer surfaces 44a and 45a are arranged approximately at right angles to one another. The guide edge 35a is encompassed by the C-shaped edge region 33a so that the outer surface 43a acts together with an inner surface 46a of the edge region 33a. Furthermore, the outer surface 44a and the inner surface 47a and the outer surface 45a and the inner surface 48a act together. As the guide edge 35b is designed in the same way as a mirror image, outer surfaces 43b, 44b and 45b act together with inner surfaces 46b, 47b and 48b in a corresponding manner.

Movement of the movable part 14 is guided by the edge regions 33a, 33b and the guide edges 35a, 35b as described above. Movement of the movable part 14 in the directions z1, z2, y1, y2 and rotation about the z-axis and the y-axis is also effectively prevented, and smooth nonbinding guiding is guaranteed for movement in direction x1, x2.

An upholstery support 49 having an outer surface 50 provided with upholstery P can be seen in FIG. 6. An inner surface 51 has ribs 52 that extend in the directions x1 and 2x and can slide on an outer surface 22 of the base 13. The inner surface 51 is of C-shape and has generally planar regions 51a, 51b and 51c. An obtuse or a right angle is formed between the regions 51a and 51b and between the regions 51a and 51c. The outer surface 22 has complementary generally planar regions 22a, 22b and 22c, but this outer surface 22 is not provided with slide ribs.

Furthermore as shown in FIG. 9, the movable part 14 is provided with a stop 54 that acts together with the shaft 28 (not shown in FIG. 6) to limit relative movement between the movable part 14 and the slide 30.

Figure 7:
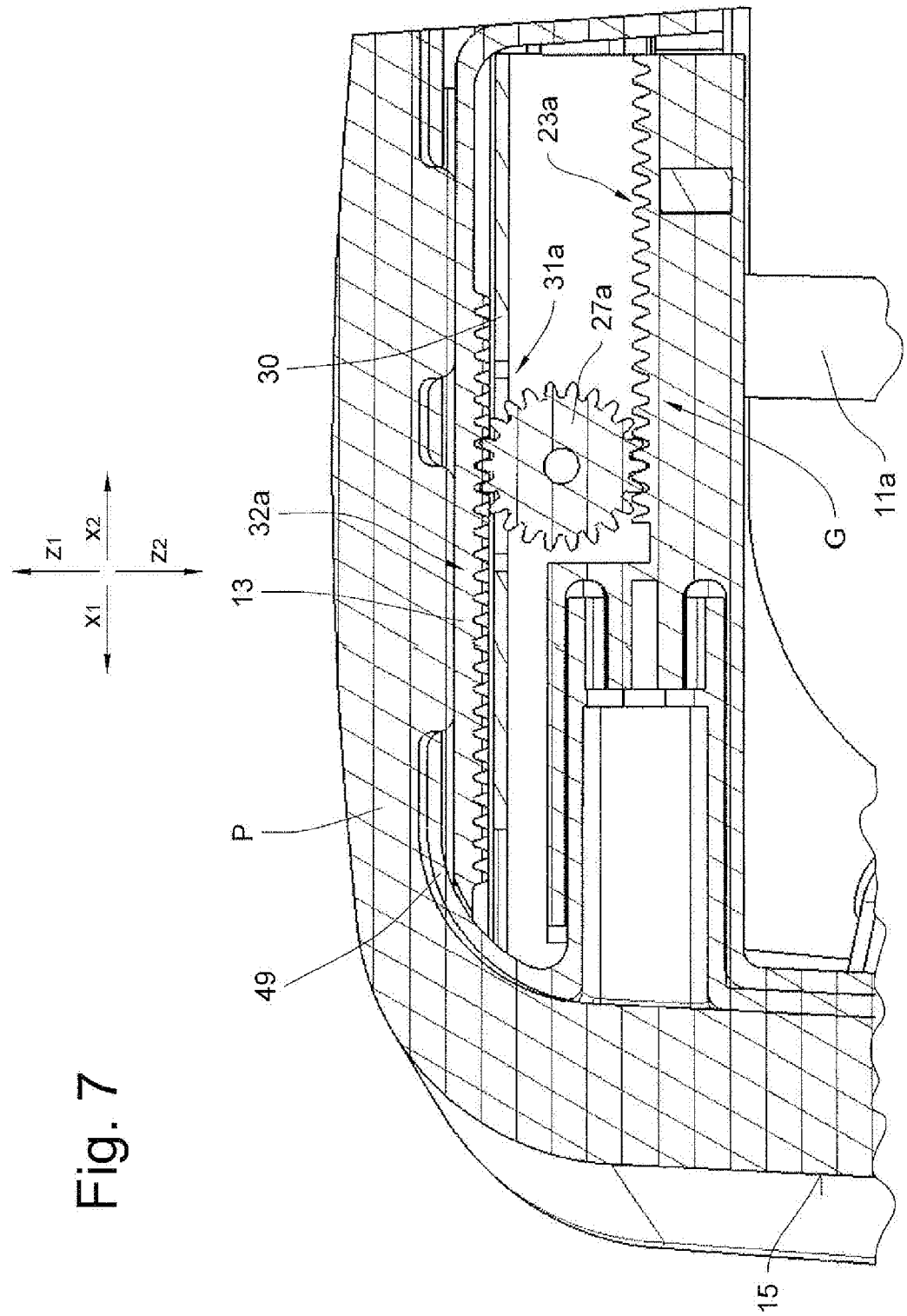
FIGS. 7 and 8 are sections taken along respective line VII-VII and VIII-VIII of FIGS. 4 and 5.

FIG. 7 shows the movable part 14 in the rest position, with the movable part 14, the slide 30 and the base 13 telescopically nested in one another.

Figure 8:
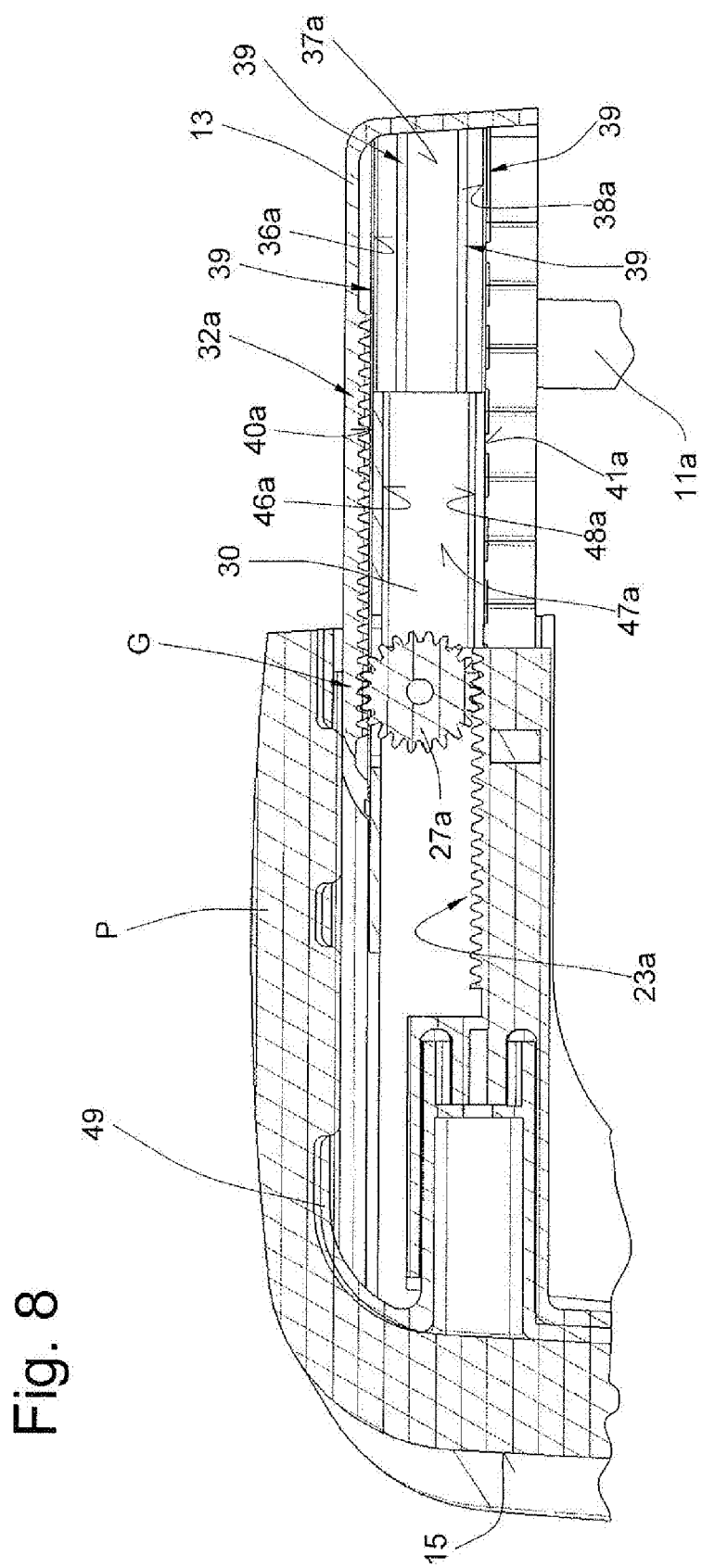

In FIG. 8, the base 13, the slide 30 and the movable part 14 are shown in the extended position in which the slide 30 projects partially out of the base 13 in the direction x1.

FIG. 9 shows the underside of the headrest 10, the support rods 11a and 11b not being shown for the sake of clarity. The movable part 14 is in the extended position. The stop 54 is in contact with the shaft 28 and prevents further movement of the movable part 14 in the direction x1 relative to the slide 30. The locking elements 25a and 25b, which are movably mounted on the movable part 14, are part of the above-mentioned one-way catch 59 that in the locked position allows movement of the movable part 14 in the direction x1 but prevents movement in the direction x2. According to FIG. 9, the locking element 25a is in a latch recess 56a formed in an end of the tooth row 24a and the locking element 25b in a latch recess 56b of the tooth row 24b.

As long as the locking elements 25a and 25b act together with the rows 24a and 24b of teeth, movement is possible in direction x1 without pressing the button 20. When the locking elements 25a and 25b engage with the latching recesses 56a and 56b, a movement of the movable part 14 is not possible without pressing the button 20. The locking elements 25a and 25b can only be released from the latching recesses 56a and 56b by pressing the button 20. When the locking elements 25a and 25b no longer engage with the latching recesses 56a and 56b, the movable part 14 can be moved in the rearward direction x2 toward the rest position.

In the embodiment shown in FIGS. 1 to 9, the movable part 14 is guided in a straight line when moving between the rest position and the extended position.

Figure 11:
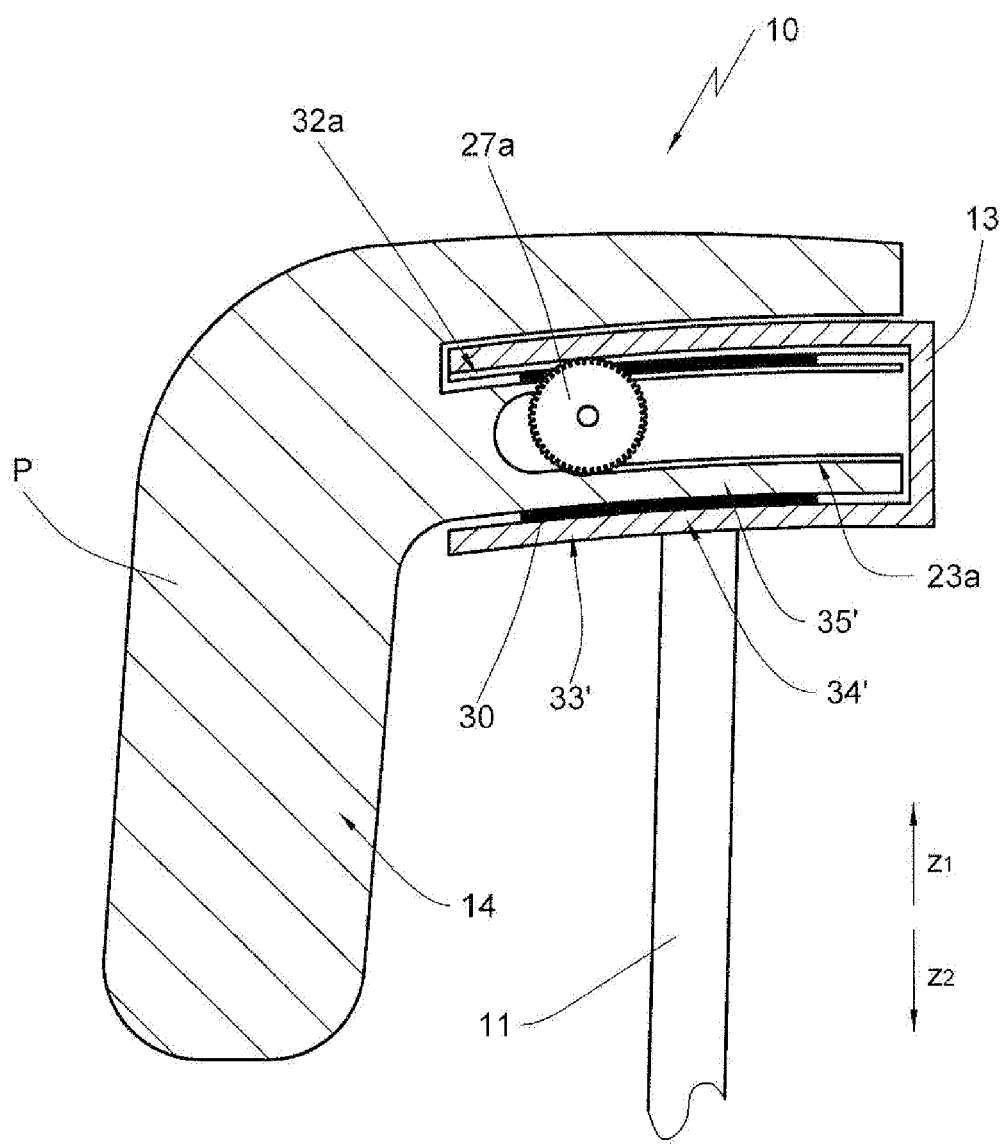
FIG. 11 is a sectional detail view of the headrest of FIG. 10.

A second embodiment is shown in FIGS. 10 and 11. According to FIG. 10, a seat back 57 of an automobile seat can be pivoted about an axis not shown in FIG. 10 but extending parallel to the horizontal transverse y-axis of the directions y1 and y2. In a first position E1 of the seat back 57 (see dashed outlines), the movable part 14 is shown in the rest position. The head contact surface 15 is at a spacing B from a head 58 of the occupant. If the seat back is pivoted to position E2, the movable part 14 must be displaced relative to the base 13 so that the head contact surface 15 assumes the spacing B from the head 58.

By guiding the movable part 14 on a curved path when moving between the rest position and the extended position, a change in an angle α between a vertical V parallel to the z-axis and the head contact surface 15 caused by the pivoting movement of the seat back 57 can be maintained approximately constant. As implied in FIG. 11, in the second embodiment, the mounting structure 34' of the base 13, the guide edge 35' of the movable part 14 and the edge region 33' of the slide 30 are curved.

We claim:

1. In combination with a motor-vehicle seat back, a headrest comprising:
    a base formed with gear teeth;
    at least one rod securing the base to the seat back;
    a head formed with gear teeth;
    a telescopic slide between the head and the base;
    respective base and head guides supporting the slide on the base and the head on the slide for displacement of the head relative to the slide and the slide relative to the base in a direction between a rear nested position and a front extended position, the slide being movable relative to both the head and the base when the head moves relative to the base between the nested and extended positions, the slide overlapping the base guide and head guide less in the extended position than in the nested position; and
    a gear carried on the slide and meshing with both the gear teeth of the head and the gear teeth of the base so as to couple the head through the slide to the base and move the slide relative to the base and to the head on movement of the head relative to the base.

2. The headrest defined in claim 1 wherein the gear gear teeth of the head are on a head rack on the head and the gear teeth of the base are on a base rack on the base.

3. The headrest defined in claim 2 wherein there are two of the head racks extending parallel to each other on the head, and two of the base racks extending parallel to each other on the base, two of the gears each meshing with a respective one of the head racks and one of the base racks, and a shaft extending between and fixing together the two gears.

4. The headrest defined in claim 1 wherein the slide and the head have interfitting guide formations extending in the direction and forming the head guide and the slide and the base have different interfitting guide formations extending in the direction and forming the base guide.

5. The headrest defined in claim 4 wherein each of the formations is formed by a plurality of generally planar surfaces extending perpendicular to each other.

6. The headrest defined in claim 4 wherein the direction is arcuate and the formations include arcuate surfaces extending parallel to the direction.

* * * * *